US007627605B1

(12) United States Patent
Lamere et al.

(10) Patent No.: US 7,627,605 B1
(45) Date of Patent: Dec. 1, 2009

(54) METHOD AND APPARATUS FOR GENERATING MEDIA PLAYLISTS BY DEFINING PATHS THROUGH MEDIA SIMILARITY SPACE

(75) Inventors: Paul B. Lamere, Nashua, NH (US); Stephen J. Green, Wakefield, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 737 days.

(21) Appl. No.: 11/182,539

(22) Filed: Jul. 15, 2005

(51) Int. Cl.
*G06F 7/00* (2006.01)
*G06F 17/00* (2006.01)
*G06F 17/30* (2006.01)

(52) U.S. Cl. ............................... 707/104.1; 707/2
(58) Field of Classification Search .................. 707/2, 707/104.1
See application file for complete search history.

(56) References Cited

U.S. PATENT DOCUMENTS

| | | | |
|---|---|---|---|
| 5,616,876 A | 4/1997 | Cluts | |
| 5,749,081 A | 5/1998 | Whiteis | |
| 5,754,938 A * | 5/1998 | Herz et al. | 725/116 |
| 6,041,311 A | 3/2000 | Chislenko et al. | |
| 6,105,018 A * | 8/2000 | Demers et al. | 707/2 |
| 6,204,763 B1 * | 3/2001 | Sone | 340/568.1 |
| 6,446,080 B1 | 9/2002 | Van Ryzin et al. | |
| 6,545,209 B1 | 4/2003 | Flannery et al. | |
| 6,748,395 B1 | 6/2004 | Picker et al. | |
| 6,904,004 B1 | 6/2005 | Van der Meulen | |
| 6,933,432 B2 * | 8/2005 | Shteyn et al. | 84/609 |
| 6,987,221 B2 * | 1/2006 | Platt | 84/601 |
| 6,996,390 B2 * | 2/2006 | Herley et al. | 455/345 |
| 7,346,562 B2 * | 3/2008 | Inoue et al. | 705/27 |
| 2002/0078029 A1 | 6/2002 | Pachet | |
| 2005/0098023 A1 | 5/2005 | Toivonen et al. | |
| 2006/0080356 A1 * | 4/2006 | Burges et al. | 707/103 R |

OTHER PUBLICATIONS

Schedl, M., Pampalk, E., Widmer, G., "Intelligent Structuring and Exploration of Digital Music Collections", Austrian Research Institute for Artificial Intelligence and Department of Computational Perception, Austria, Nov. 2004, 14 pages.
Logan, B., Ellis, D., Berenzweig, A., "Toward Evolution Techniques for Music Similarity", Cambridge Research Laboratory, SIGIR 2003: Workshop on the Evaluation of Music Information Retrieval Systems, Aug. 2003, 11 pages.

* cited by examiner

*Primary Examiner*—James Trujillo
*Assistant Examiner*—Jorge A Casanova
(74) *Attorney, Agent, or Firm*—Osha • Liang LLP (57) ABSTRACT

A media playlist is generated from a set of two or more seed media selections as well as the desired number of selections in the playlist. The seed selections represent waypoints in "media space". A playlist is generated by finding a path of "stepping stone" selections between the waypoints, with the constraints that no selection is presented more than once and the maximum distance between stepping stones is minimized. In one embodiment, an "endless" playlist by adding a final path from the last playlist selection back to a selection that is nearest the first selection, but has not been presented yet. In still another embodiment, a separate set of "avoid" selections is maintained. When generating the playlist, given a set of paths that meet the aforementioned path generation constraints, paths will be selected that maximize the distance from the set of "avoid" selections.

30 Claims, 7 Drawing Sheets

METHOD AND APPARATUS FOR GENERATING MEDIA PLAYLISTS BY DEFINING PATHS THROUGH MEDIA SIMILARITY SPACE

BACKGROUND

This invention relates to multimedia items, such as music, movies, fashions, books, television shows and other entertainment choices, and to methods and apparatus for receiving inputs from a user and generating media playlists or lists that determine the order in which media are presented to a consumer. One area where the generation of playlists is of particular current interest is music playlists. In previous decades, a music listener's music collection was pre-organized onto albums and tapes. When a listener wanted to listen to a music selection, they would select an album that included the selection, cue the album and listen to it. Today, however, music collections can consist of hundreds, thousands, or even millions of individual songs stored as individual files on a computer. Selecting and organizing subsets of these songs into "playlists", that is, an ordered list of songs is an essential task of the music listener. However this task is tedious, especially when the music collection is large and diverse.

Consequently, various methods have been devised in order to automatically generate media playlists from a media collection. These methods generally strive to possess the following characteristics:

- they are relatively automatic and require little or no consumer intervention;
- they generate playlists that contain only media selections that a consumer wants to review and do not contain "bad" selections that the consumer does not want to review;
- they generate playlists that include a mix of old "favorite" selections as well as new (to the consumer) selections. The optimum ratio of old to new media selections varies from consumer to consumer; and
- they generate playlists that contain a variety of media styles. Again, the optimum range of variety varies from consumer to consumer. For instance, with song selections, one listener may enjoy a variety of music ranging from 70's classic rock to big band jazz while another listener may enjoy the narrow range that encompasses "thrash" and "death metal" music.

A number of conventional strategies have been developed that automate the generation of playlists. For example, one conventional method is called the "shuffle play" method. This method (recently touted with the "iPod shuffle" product being sold by Apple Computer Corporation) generates a playlist by randomizing the reviewing order of an entire collection of media. This technique works fine for small media collections, but does not scale well. For example, using shuffle play with a music collection of a million songs will result in a playlist that contains few (if any) songs of interest to a listener. Thus, with large media collections, the shuffle play method generates playlists where ratio of "bad" selections to total selections approaches one.

Another conventional technique is called "recently played." This technique populates a playlist with media selections that have been recently reviewed by the consumer. It ensures that the playlist contains only media selections familiar (and presumably appealing) to the consumer. However playlists generated with this technique will never contain new media selections or selections unfamiliar to the consumer. For many consumers, exposure to new selections is very important. This method eliminates that possibility.

Still another prior art technique is called "similar to." This technique populates a playlist with selections that are "similar to" an initial seed selection or seed selection set. Similarity is based on the type of media, for example, in the case of music, acoustical similarity may be used to select songs. This technique will allow new selections to appear in the playlist while at the same time restricting the playlist to selections that sound like a particular selection or selection set which the consumer enjoys. The "similar-to" technique"—reduces the number of "bad" selections and "no new selections" problems discussed previously but suffers from the lack of variety. All selections in the playlist will appear similar to the consumer.

SUMMARY

In accordance with the principles of the invention, the consumer provides a set of two or more seed media selections as well as the desired number of selections in the playlist. The seed selections represent waypoints in "media space". A playlist is generated by finding a path of "stepping stone" selections between the waypoints, with the constraints that no selection is visited more than once and the maximum distance between stepping stones is minimized. In this context, "distance" represents the similarity or dissimilarity of two selections. Smaller distances indicate selections that are similar, larger distances represent dissimilar selections. In effect, the seed selections define points on a path through the media space.

In one embodiment, an "endless" playlist is generated. In this embodiment, the consumer submits a set of two or more seed selections as before. A final path is added from the last selection back to a selection that is nearest the first selection, but has not been presented yet. Since the "first" selection is now slightly different than the first selection of the previous playlist, a new playlist will be generated as the "stepping stone" selections are added. An endless set of selections can be generated by continually orbiting through the calculated paths. The constraint of not allowing a selection to be revisited will cause the overall playlist to change over time.

In still another embodiment, a separate set of "avoid" selections is maintained. When generating the playlist, given a set of paths that meet the aforementioned path generation constraints, paths will be selected that maximize the distance from the set of "avoid" selections. This variant provides the ability for the consumer to avoid selections that they do not want to review.

DETAILED DESCRIPTION

In accordance with the principles of the invention, the similarity between any two media selections can be determined by calculating a "distance" between the two selections that represents the similarity or dissimilarity of the two selections. Smaller distances indicate selections that are more similar, while larger distances represent selections that are less similar. The metric used to measure distances depends on the nature of the selection. For example, for music selections, any of a wide variety of distance metrics including, but not limited to, spectral distance, rhythm distance, timbral distance, Erdos number (artist A played with artist B) or influenced distance (artist B influenced by artist A) or combinations of the aforementioned distances could be used.

Figure 1:
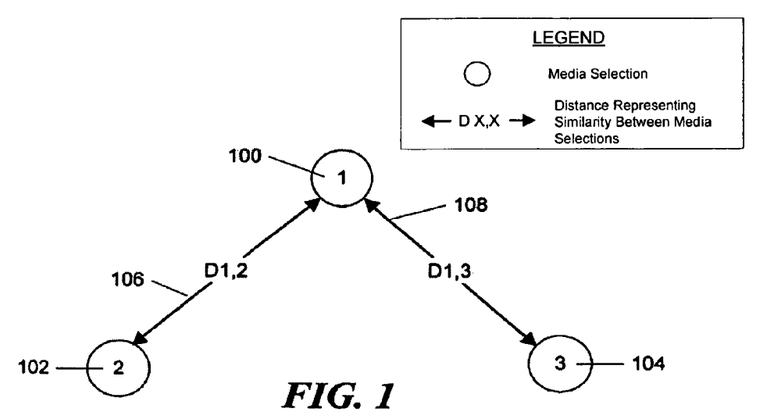
FIG. 1 is a schematic diagram illustrating how the "distance" between selections is affected by the similarity or dissimilarity of the selections.

FIG. 1 illustrates the idea of distance between pairs of selections. In particular, between the selection pair consisting of selection 1 (100) and selection 2 (102) and between selection 1 (100) and selection 3 (104). Distance D1, 2 (106) represents the similarity between selections 100 and 102 whereas distance D1,3 (108) represents the similarity of selections 100 and 104. Accordingly, if distance 106 is less than distance 108 then selection 100 and 102 are more similar than selections 100 and 104.

For a given set of media selections, distance can be calculated for each pair of selections to determine the degree of similarity between those selections. The resulting distances can then be processed to generate a playlist in accordance with the principles of the invention. In general, the playlist will be generated by finding a path of "stepping stone" media selections between the waypoints provided by the consumer, with the constraints that no selection is presented more than once and the maximum distance between stepping stones is minimized.

For instance, given two seed selections and a request to generate a twenty-five selection playlist, a playlist will be generated with one seed selection as the initial selection, and the other seed selection as the final selection and twenty-three intervening "stepping stone" selections, where the distance between selections is, on average, ¹/₂₄ the distance between the two seed selections. Likewise, given four seed selections, a playlist will be generated by finding a path that connects the four waypoints with a consistent distance between the stepping stone selections.

One method of processing the distance data is to consider the media selections as forming an undirected connected graph in which each graph vertex corresponds to one selection and the graph edges being represented by the distance between two selections. The edge weight is the distance value for that edge. Then, conventional graph theory can be used to process the graph and determine the playlist selections.

For example, the entire media space can be represented by a "minimum spanning tree" computed from the aforementioned graph. A minimum spanning tree of a connected graph is an acyclic subset of the graph that connects all of the vertices and whose total edge weight is minimized. There are several published algorithms for building a minimum spanning tree from a graph, any of which can be used in accordance with the present invention. For example, an algorithm that can be used to build such a minimum spanning tree is Prim's algorithm. A detailed description of Prim's algorithm can be found starting on page 570 of "Introduction to Algorithms", Thomas H. Cormen, Charles E. Leiserson, Ronald L. Rivest, and Clifford Stein, The MIT Press and McGraw-Hill, second edition, 2001, which description is hereby incorporated by reference.

Figure 2:
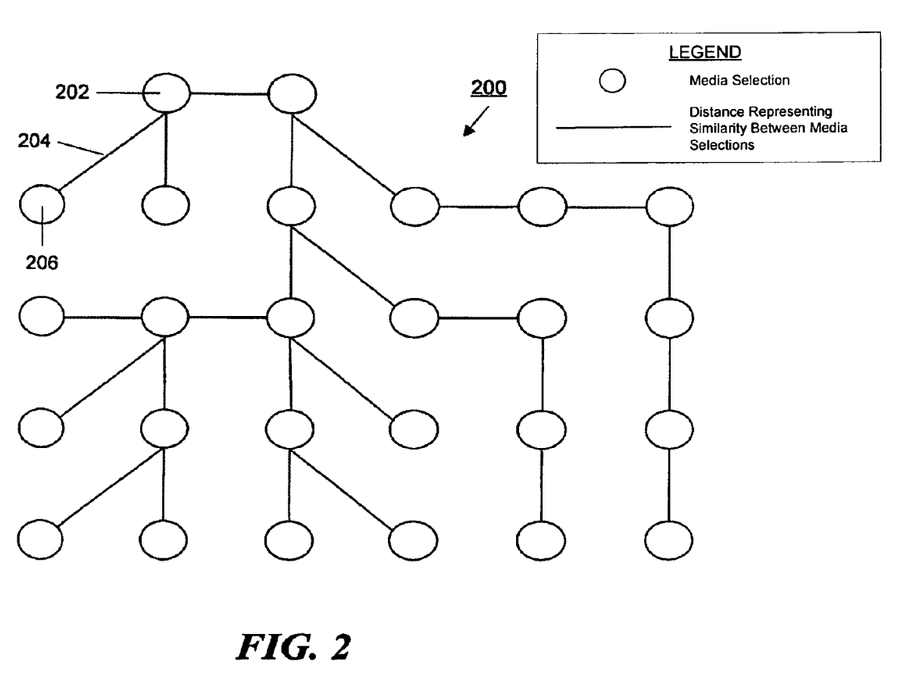
FIG. 2 is a schematic diagram that illustrates a sample minimum spanning tree that represents a media space containing a plurality of media selections.

FIG. 2 illustrates an illustrative spanning tree 200 in which the circles, such as circles 202 and 206, represent media selections and the edge 204 indicates the distance between the selections 202 and 206 with the edge weight equaling the distance value. Minimum spanning tree 200 can be used to generate a playlist in accordance with the principles of the present invention by the apparatus shown in FIG. 4 by the process whose steps are illustrated by the flowchart shown in FIG. 5. In particular, this process starts in step 500 and proceeds to step 502 where a total selection count 402 for the playlist and the "seed" or waypoint selections 410 are received from the consumer.

Figure 4:
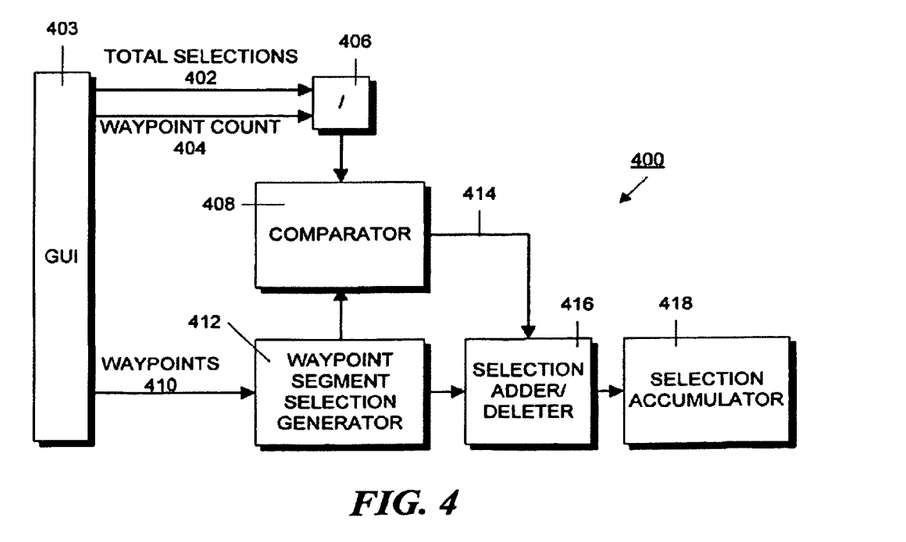
FIG. 4 is a block schematic diagram of an illustrative apparatus for generating a playlist in accordance with the principles of the present invention.
Figure 5:
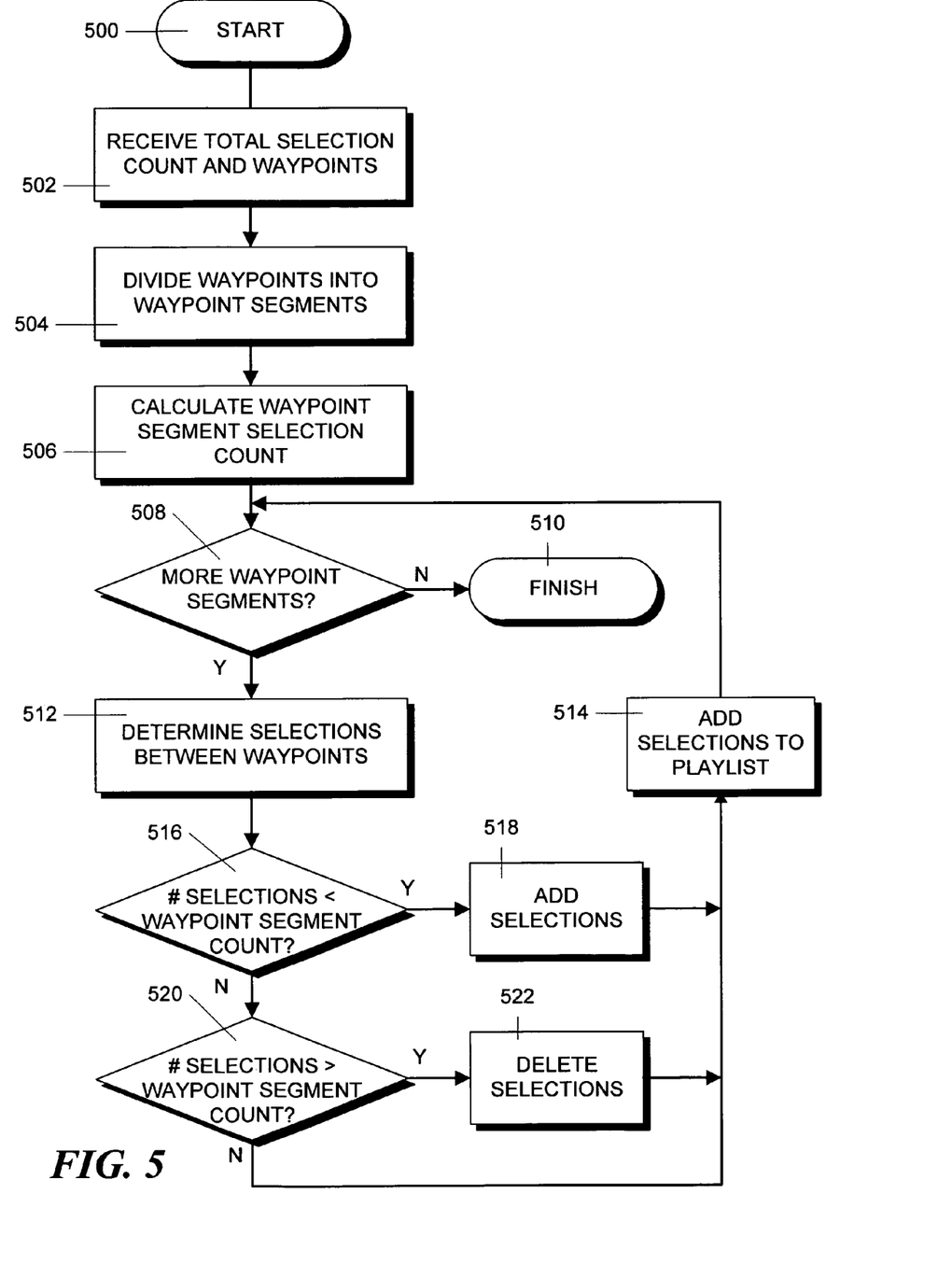
FIG. 5 is a flowchart that illustrates the steps in an illustrative process for creating a playlist in accordance with the principles of the present invention from a set of seed selections provided by a consumer.

The total selection count 402 for the playlist and the "seed" or waypoint selections 410 may be received from a conventional graphic user interface (GUI) 403 or other mechanism for receiving selection information by the waypoint segment selection generator 412. The GUI 403 may allow the consumer to manually enter information identifying the media selections or, alternatively provide prompts, such as media "clips" for presentation to the consumer to facilitate the consumer's decision. The consumer may also indicate a presentation order for the waypoints or, in the absence of a presentation order, the entry order of the waypoints will be considered as the presentation order. Once the waypoints have been entered, the GUI 403 determines the number of entered waypoints 404. Pairs of waypoints, taken in their presentation order, divide the playlist into waypoint segments and, in step 504, the generator 412 determines the waypoint segments.

Next, in step 506, the number of selections which will be chosen for each waypoint segment is calculated by using a divider 406 to divide the total number of selections 402 for the playlist by the number of waypoints 404.

Then, in step 508, a determination is made whether any additional waypoint segments remain to be processed by the waypoint segment selection generator 412. If segments remain to be processed, then the process proceeds to step 512 where media selections that will be presented between the waypoint selections are chosen. These selections are chosen by using the minimum spanning tree shown in FIG. 2. In particular, a list of selections can be determined by traversing the tree, starting at one waypoint selection and proceeding to the next waypoint selection and collecting the selections encountered along the way.

Figure 3:
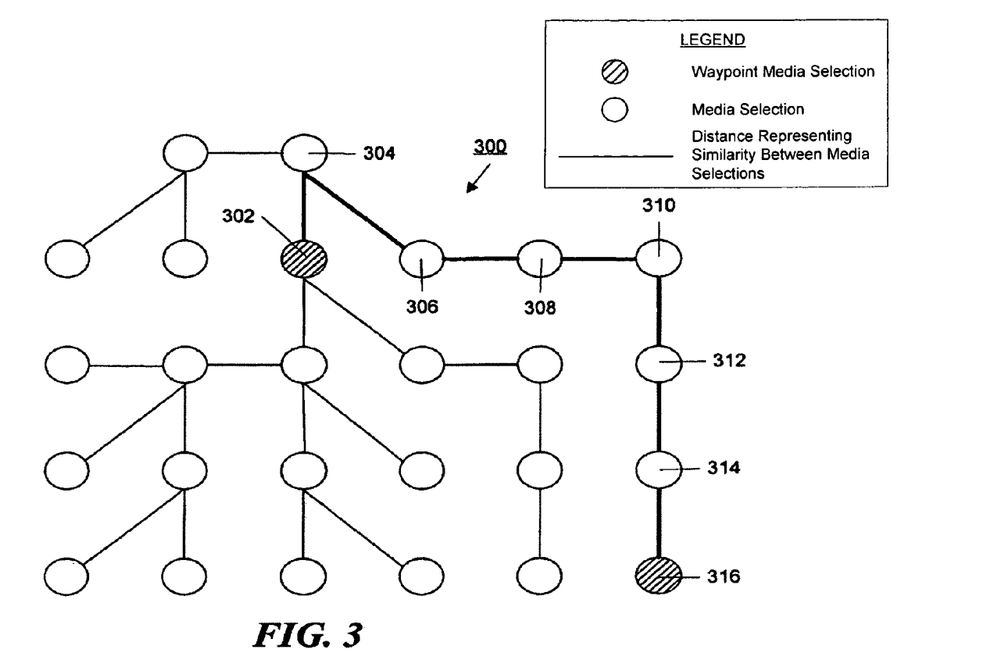
FIG. 3 is a schematic diagram that illustrates the media space of FIG. 2 illustrating the determination of media selections between two "seed", or waypoint, selections that have been indicated by the consumer.

This process is illustrated in FIG. 3. In this figure, the minimum spanning tree 300 is used and the starting waypoint for the particular waypoint segment is waypoint 302 and the ending waypoint is waypoint 316. Traversing the tree 300 from waypoint 302 to waypoint 316 generates a set of waypoint segment selections, including selections 304, 306, 308, 310, 312 and 314. This set of selections form the minimum, "bottleneck" path between the two waypoints 302 and 316. In most cases, the number of selections in the set does not match the waypoint segment selection count previously calculated by divider 406 and, accordingly, the set typically must be adjusted.

In step 516, the divider 406 applies the waypoint segment selection count to a comparator 408. The number of selections in the set determined from the minimum spanning tree is also provided by generator 412 to comparator 408. The result of the comparison, indicated schematically by arrow 414, is provided to selection adder/deleter 416.

Figure 6:
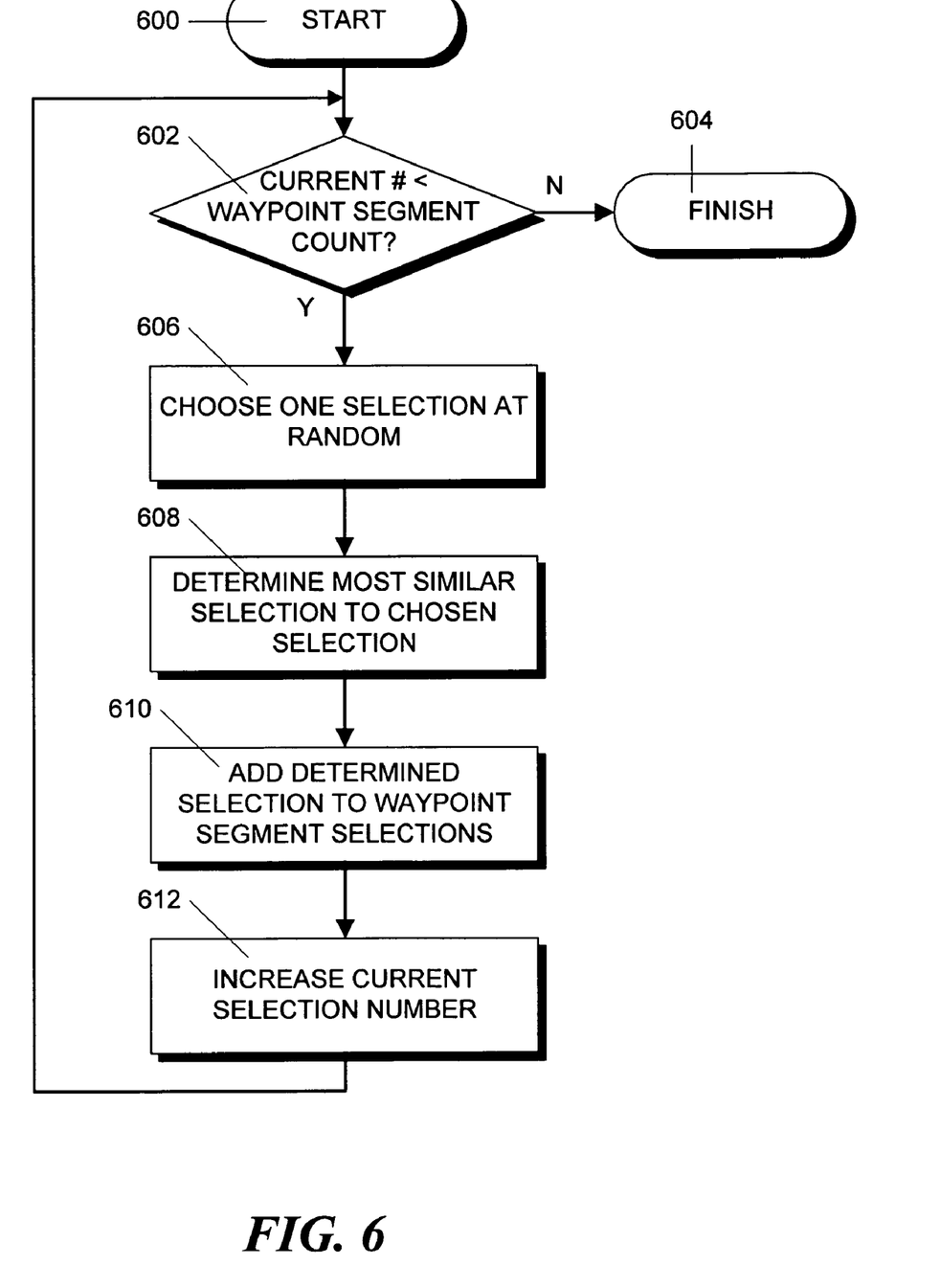
FIG. 6 is a flowchart that illustrates the steps in an illustrative process for adding selections to a waypoint segment that has fewer selections than the calculated waypoint segment selection count.

If there are fewer selections in the segment than are required, then the adder/deleter 416 proceeds to step 518 where additional selections are added. This process is outlined in FIG. 6. The adding process starts in step 600 and proceeds to step 602, where a determination is made whether the current number of selections is less than the waypoint segment selection count. If so, in step 606, a random selection in the set is chosen. Then, in step 608, the most similar selection in the media space that is not already in the set is determined by examining the distance information between the chosen random selection and other selections. In step 610, the most similar selection is added to the set of waypoint segment selections after the chosen random selection. Then, in step 612, the current number of selections in the set is increased and the process returns to step 602 to determine if the current number of selection in the set is still less than the waypoint segment selection count. If so, another selection is added, via steps 606-612. The process continues in this manner until, as determined in step 602, the number of selections in the set reaches the waypoint segment selection count and the process finishes in step 604.

Returning to FIG. 5, the process then proceeds to step 514 where the selections that have been determined for the selected segment are added to the playlist by the selection accumulator 418 and the process returns to step 508 to determine if further waypoint segments remain to be processed.

Figure 7:
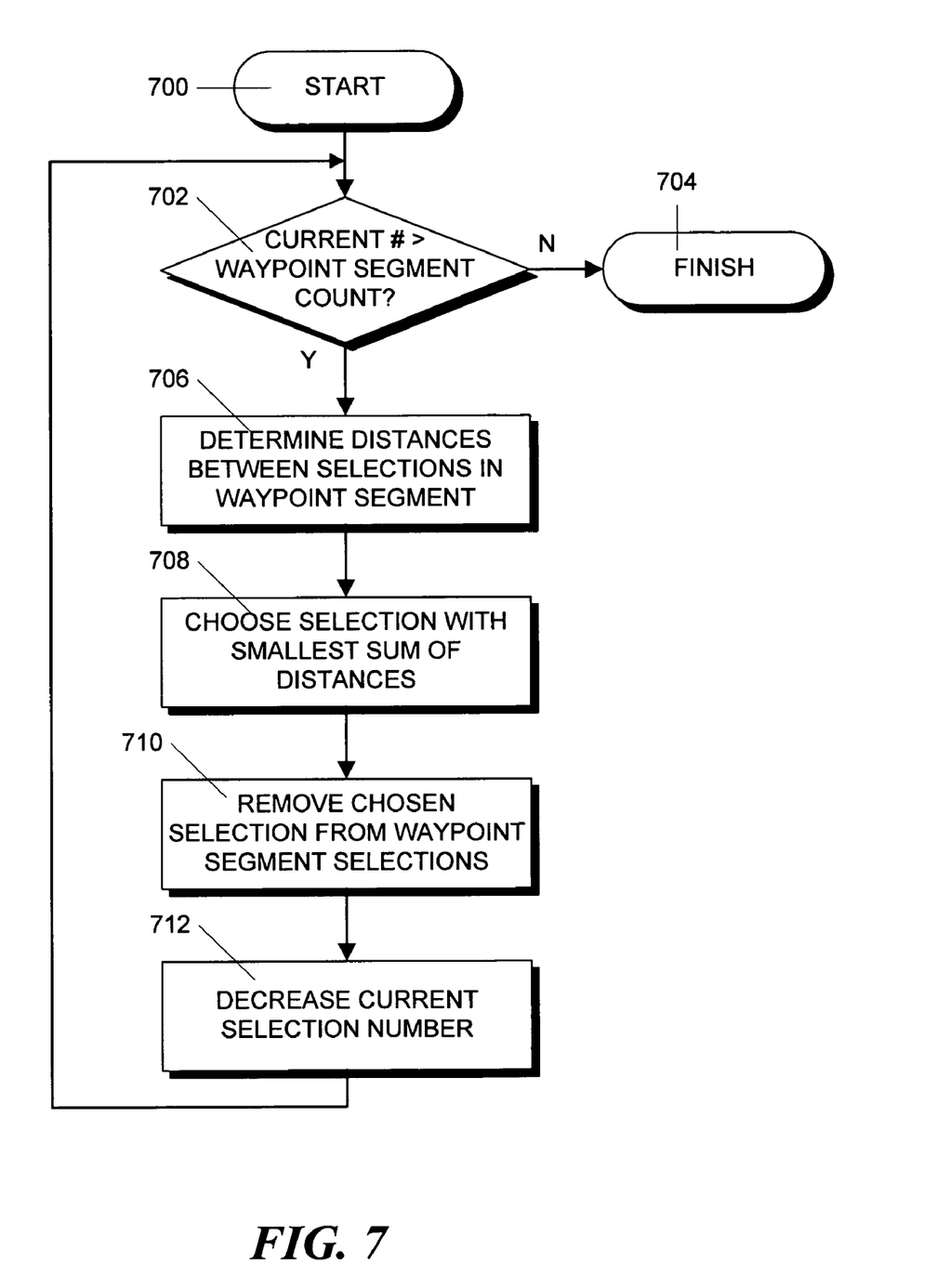
FIG. 7 is a flowchart that illustrates the steps in an illustrative process for deleting selections from a waypoint segment that has more selections than the calculated waypoint segment selection count.

If in step 516 it is determined that the number of selections in the set for the current waypoint segment is not greater than the waypoint segment selection count, then the process proceeds to step 520 where the segment adder/deleter 416 determines whether there are fewer selections in the segment than are required. If so, the adder/deleter 416 deletes selections from the current set in step 522. This process is outlined in FIG. 7. The deleting process starts in step 700 and proceeds to step 702, where a determination is made whether the current number of selections is greater than the waypoint segment selection count. If so, in step 706, the distances between the waypoint selections in the determined set are calculated. Then, in step 708, the selection in the set that will leave smallest gap between the preceding and following selections (when it is removed) is chosen. This selection will be the selection where the sum of the distances between the selection and the preceding and following selections is smallest. In step 710, the chosen selection is removed from the current set. Then, in step 712, the current number of selections in the set is decreased and the process returns to step 702 to determine if the current number of selection in the set is still greater than the waypoint segment selection count. If so, another selection is added, via steps 706-712. The process continues in this manner until, as determined in step 702, the number of selections in the set reaches the waypoint segment selection count and the process finishes in step 704.

Returning to FIG. 5, the process then proceeds to step 514 where the selections that have been determined for the selected segment are added to the playlist by the selection accumulator 418 and the process returns to step 508 to determine if further waypoint segments remain to be processed.

Alternatively, if, in step 516, it is determined that the number of selections in the set for the current waypoint segment is not greater than the waypoint segment selection count, then the number of selection in the current waypoint set equals the waypoint segment selection count and the process proceeds to step 514 where the selections that have been determined for the selected segment are added to the playlist by the selection accumulator 418 and the process returns to step 508 to determine if further waypoint segments remain to be processed Processing continues in this fashion until, as determined in step 508, no more waypoint segments remain to be processed, then the playlist is completed in step 510. Generating a playlist in this manner allows for the generation of a playlist with minimal number of "bad" selections, while including new selections and selections of a wide variety.

Figure 8A:
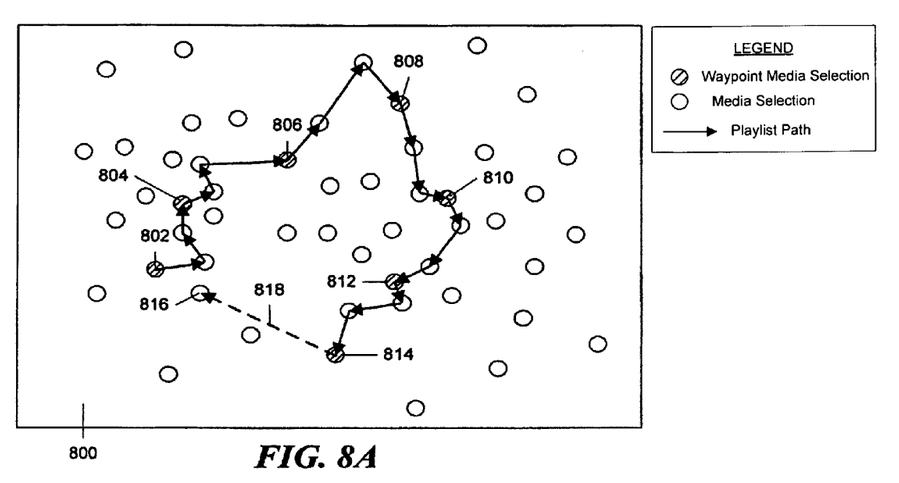
FIG. 8A is a schematic diagram that illustrates the formation of an "endless" playlist by the addition of a final path to the last selection of a playlist back to a selection that is nearest the first selection, but has not been presented yet.
Figure 8B:
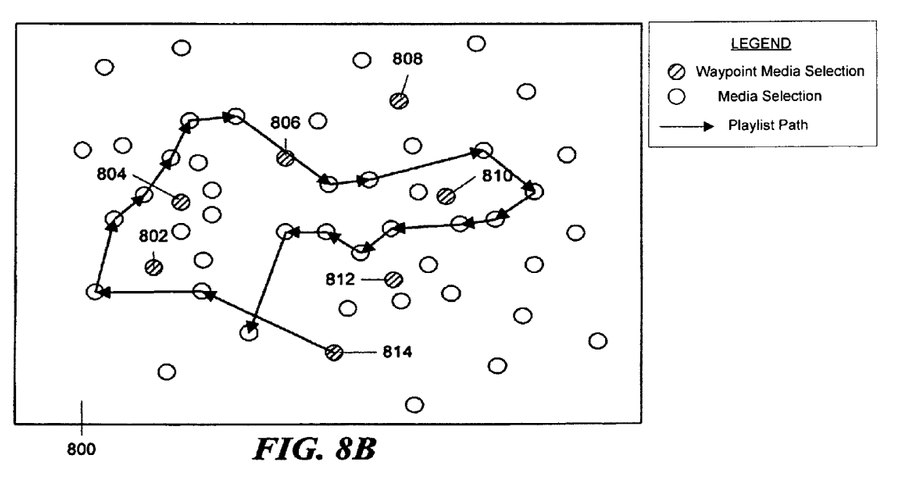
FIG. 8B is a schematic diagram that illustrates the playlist generated by the addition of the final path in FIG. 8A.

In one embodiment, an "endless" playlist can be generated. In this embodiment, the consumer submits a set of two or more seed selections as described above. In accordance with the generation procedure described above, a playlist will be generated. For example, FIG. 8A shows a media space 800 in which media selections are illustrated as small circles. In this example, the seed selections received from the consumer are illustrated as shaded circles 802, 804, 806, 808, 810, 812 and 814. The playlist determined in accordance with the aforementioned method and apparatus is illustrated as a series of arrows that comprise a "path" between selections. In order to create an "endless" playlist, a final path from the last selection back to a selection that is nearest the first selection and that has not been played yet is selected. For example, this path might consist of path 818 from final selection 814 to selection 816 that is near initial selection 802. The initial selection 802 is not chosen because the constraint that no selection can be presented twice is still in effect. The constraint of not allowing a selection to be re-presented will cause the overall playlist of selections to change over time. For example, as shown in FIG. 8B, since the initial selection is different from the previous initial selection and no selection can be re-presented, the selections on the path differ from those previously on the playlist. Thus, the initial seed selections 802-814 are not revisited.

Figure 9A:
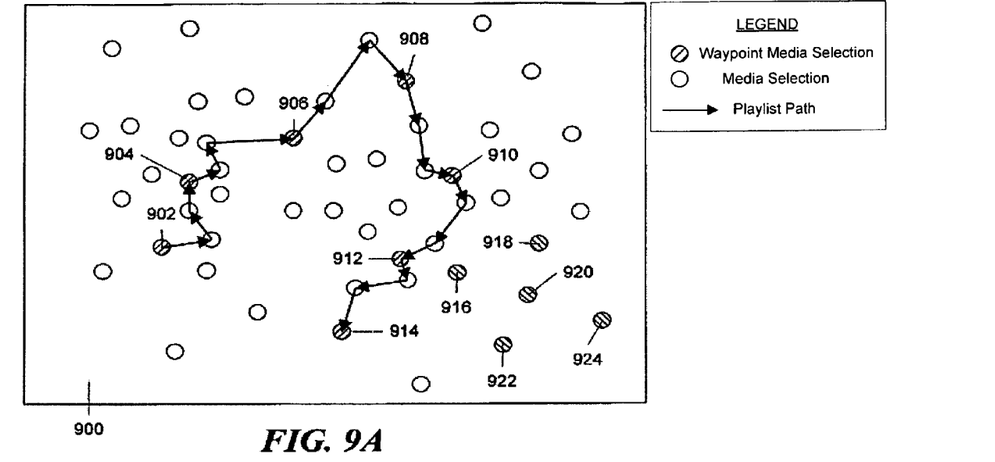
FIG. 9A is a schematic diagram that illustrates the formation of a "keep-away" playlist in which the consumer has designated several selections that they do not want to review.
Figure 9B:
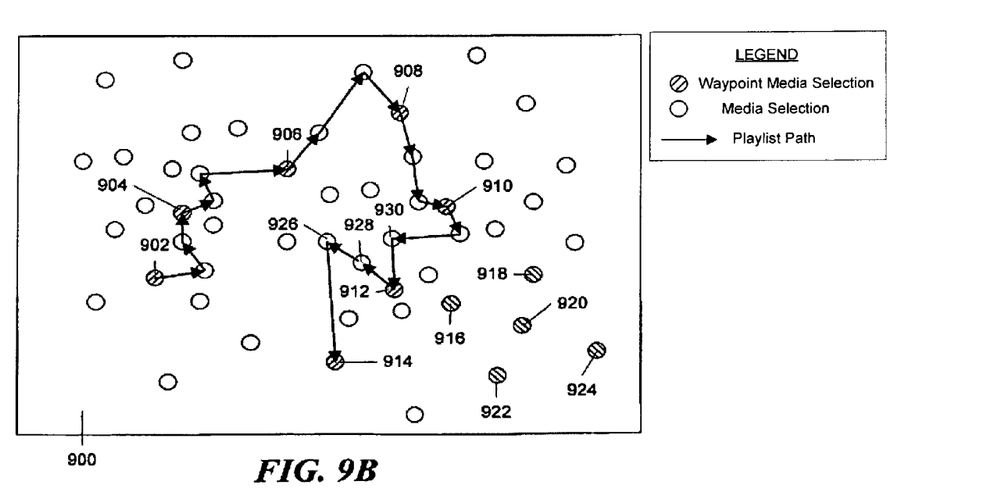
FIG. 9B is a schematic diagram that illustrates the playlist generated by the designation of the selections in FIG. 9A.

In another embodiment, a separate set of "avoid" selections is maintained. When generating the playlist, selections are chosen that maximize the distance from the set of "avoid" selections. This can be done simply by not allowing an "avoid" selection to be chosen for the playlist or by using a multiplier with the distance between the "avoid" selections and all other selections in order to move the "avoid" selections out of the range of possible selections that will be chosen for the playlist. This embodiment is illustrated in FIGS. 9A and 9B. In a similar manner to FIG. 8A, FIG. 9A shows a media space 900 in which media selections are illustrated as small circles. In this example, the seed selections received from the consumer are illustrated as shaded circles 902, 904, 906, 908, 910, 912 and 914. The playlist determined in accordance with the aforementioned method and apparatus is illustrated as a series of arrows that comprise a "path" between selections. A set of avoid selections 916, 918, 920, 922 and 924 is then received from the consumer. If a multiplier is used to avoid the set of avoid selections, the playlist may be recalculated as shown in FIG. 9B to increase the distance from the avoid selections. This may cause some selections that were on the original playlist to be omitted and some new selections (926, 928 and 930 to be added.) This embodiment provides the ability for the consumer to avoid a "bad neighborhood".

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, a different method other than graph theory may be used to process the media space and arrive at a playlist. The order of the process steps may also be changed without affecting the operation of the invention. Other aspects, such as the specific process flow, as well as other modifications to the inventive concept are intended to be covered by the appended claims.

What is claimed is:

1. A method for generating a media playlist from a group of media selections, comprising:
    (a) receiving a set of two or more waypoint media selections in the group and a presentation order of the two or more waypoint media selections;
    (b) determining, using a computer, a distance between each pair of media selections in the group, which distance represents a degree of similarity between that pair of media selections;
    (c) for a waypoint segment comprising a pair of adjacent waypoint media selections in the presentation order, generating, using the computer, a waypoint set by adding at least one media selection to the presentation order between the pair of adjacent waypoint media selections, wherein the waypoint set comprises the pair of adjacent waypoint media selections and the at least one media selection, wherein adding the at least one media selection is with constraints that no media selection is presented more than once in the presentation order and a maximum distance between adjacent media selections in the presentation order in the waypoint set is minimized; and
    (d) adding the waypoint set determined in step (c) to the playlist.

2. The method of claim 1 further comprising computing a minimum spanning tree for a graph representing the group of media selections in which each graph vertex is a media selection in the group and each graph edge between two graph vertices is a distance between two media selections that correspond to the two graph vertices and the edge weight is a value of that distance.

3. The method of claim 2 wherein in step (c) generating the waypoint set by adding at least one media selection comprises generating the waypoint set by traversing the minimum spanning tree from a first waypoint media selection in the waypoint segment to a second waypoint media selection in the waypoint segment and adding all media selections encountered during the traversal to the waypoint set.

4. The method of claim 3 wherein step (c) further comprises:
    (c1) adding media selections to the waypoint set when a number of media selections in the waypoint set is less than a predetermined number.

5. The method of claim 4 wherein adding the media selections comprises choosing a media selection in the waypoint set in a random manner, determining a new media selection from the group that has a smallest distance from the randomly chosen media selection and that is not already in the waypoint set and adding the new media selection to the waypoint set.

6. The method of claim 3 wherein step (c) the further comprises:
    (c1) deleting media selections from the waypoint set when a number of media selections in the waypoint set is greater than a predetermined number.

7. The method of claim 6 wherein deleting the media selections comprises choosing a media selection in the waypoint set that will leave a smallest gap between preceding and following selections when removed and removing the media selection from the waypoint set.

8. The method of claim 1 wherein the media selections are music selections and step (b) comprises determining a distance between each pair of media selections in the group by using a distance metric comprising one of the group consisting of spectral distance, rhythm distance, timbral distance, Erdos number and influence distance.

9. The method of claim 1 further comprising:
    (e) choosing a new selection that is close to a first selection in the waypoint selection set; and
    (f) repeating steps (b), (c) and (d) in order to generate a new playlist.

10. The method of claim 1 further comprising:
    (e) designating an avoidance set of media selections which are to be avoided; and
    (f) repeating steps (b), (c) and (d) with the constraint that media selections in the avoidance set cannot be included in the playlist.

11. Apparatus for generating a media playlist from a group of media selections, comprising:
    memory having instructions when executed by a processor comprise functionality to receive a set of two or more waypoint media selections in the group and a presentation order of the two or more waypoint media selections;
    a mechanism that determines a distance between each pair of media selections in the group, which distance represents a degree of similarity between that pair of media selections;

a waypoint segment selection generator that, for a waypoint segment comprising a pair of adjacent waypoint media selections in the presentation order, generates a waypoint set by adding at least one media selection to the presentation order between the pair of adjacent waypoint media selections, wherein the waypoint set comprises the pair of adjacent waypoint media selections and the at least one media selection, wherein adding the at least one media selection is with constraints that no media selection is presented more than once in the presentation order and a maximum distance between adjacent media selections in the presentation order in the waypoint set is minimized; and a selection accumulator that adds the waypoint set determined by the waypoint segment selection generator to the playlist.

12. The apparatus of claim 11 further comprising a mechanism that computes a minimum spanning tree for a graph representing the group of media selections in which each graph vertex is a media selection in the group and each graph edge between two graph vertices is a distance between two media selections that correspond to the two graph vertices and the edge weight is a value of that distance.

13. The apparatus of claim 12 wherein in the waypoint segment selection generator, generating the waypoint set by adding at least one media selection is by a mechanism that generates the waypoint set by traversing the minimum spanning tree from a first waypoint media selection in the waypoint segment to a second waypoint media selection in the waypoint segment and a mechanism that adds all media selections encountered during the traversal to the waypoint set.

14. The apparatus of claim 13 wherein the waypoint segment selection generator further comprises:
a selection adder/deleter that adds media selections to the waypoint set when the number of media selections in the waypoint set is less than a predetermined number.

15. The apparatus of claim 14 wherein the selection adder/deleter comprises a mechanism that chooses a media selection in the waypoint set in a random manner, determines a new media selection from the group that has a smallest distance from the randomly chosen media selection and that is not already in the waypoint set and adds the new media selection to the waypoint set.

16. The apparatus of claim 13 wherein the waypoint segment selection generator further comprises:
a selection adder/deleter that deletes media selections from the waypoint set when the number of media selections in the waypoint set is greater than a predetermined number.

17. The apparatus of claim 16 wherein the selection adder/deleter comprises a mechanism that chooses a media selection in the waypoint set that will leave a smallest gap between preceding and following media selections when removed and that removes the media selection from the waypoint set.

18. The apparatus of claim 11 wherein the media selections are music selections and the mechanism that determines a distance between each pair of media selections comprises a mechanism that determines a distance between each pair of media selections in the group by using a distance metric comprising one of the group consisting of spectral distance, rhythm distance, timbral distance, Erdos number and influence distance.

19. The apparatus of claim 11 further comprising:
a mechanism that chooses a new selection that is close to a first selection in the waypoint selection set; and
a mechanism that generates a new playlist from the new selection using the mechanism that determines a distance between each pair of media selections, the waypoint segment selection generator and the selection accumulator.

20. The apparatus of claim 11 further comprising:
a user interface that designates an avoidance set of media selections which are to be avoided;
a mechanism that generates a new playlist from the new selection using the mechanism that determines a distance between each pair of media selections, the waypoint segment selection generator and the selection accumulator with the constraint that media selections in the avoidance set cannot be included in the playlist.

21. A computer program product for generating a media playlist from a group of media selections, comprising a computer readable medium for storing computer readable program code thereon including:
program code for receiving a set of two or more waypoint media selections in the group and a presentation order of the two or more waypoint media selections;
program code for determining a distance between each pair of media selections in the group, which distance represents a degree of similarity between that pair of media selections;
program code, for a waypoint segment comprising a pair of adjacent waypoint media selections in the presentation order, for generating a waypoint set by adding at least one media selection to the presentation order between the pair of adjacent waypoint media selections, wherein the waypoint set comprises the pair of adjacent waypoint media selections and the at least one media selection, wherein adding the at least one media selection is with constraints that no media selection is presented more than once in the presentation order and a maximum distance between adjacent media selections in the presentation order in the waypoint set is minimized; and
program code for adding the waypoint set to the playlist.

22. The computer program product of claim 21 further comprising program code for computing a minimum spanning tree for a graph representing the group of media selections in which each graph vertex is a media selection in the group and each graph edge between two graph vertices is a distance between two media selections that correspond to the two graph vertices and the edge weight is a value of that distance.

23. The computer program product of claim 22 wherein in the program code for generating the waypoint set, adding at least one media selection is by traversing the minimum spanning tree from a first waypoint media selection in the waypoint segment to a second waypoint media selection in the waypoint segment and adding all media selections encountered during the traversal to the waypoint set.

24. The computer program product of claim 23 where in the program code for generating the waypoint set comprises program code for adding media selections to the waypoint set when a number of media selections in the waypoint set is less than a predetermined number.

25. The computer program product of claim 24 wherein the program code for adding media selections to the waypoint set comprises program code for choosing a media selection in the waypoint set in a random manner, program code for determining a new media selection that has a smallest distance from the randomly chosen media selection and that is not already in the waypoint set and program code for adding the new media selection to the waypoint set.

26. The computer program product of claim 23 wherein the program code for generating the waypoint set comprises program code for deleting media selections from the waypoint set when a number of media selections in the waypoint set is greater than a predetermined number.

27. The computer program product of claim 26 wherein the program code for deleting media selections from the waypoint set comprises program code for choosing a media selection in the waypoint set that will leave a smallest gap between preceding and following media selections when removed and program code for removing the media selection from the waypoint set.

28. The computer program product of claim 21 wherein the media selections are music selections and the program code for determining a distance between each pair of media selections comprises program code for determining a distance between each pair of media selections in the group by using a distance metric comprising one of the group consisting of spectral distance, rhythm distance, timbral distance, Erdos number and influence distance.

29. The computer program product of claim 21 further comprising:

program code for choosing a new selection that is close to a first selection in the waypoint selection set; and program code for generating a new playlist from the new selection using the mechanism that determines a distance between each pair of media selections, the waypoint segment selection generator and the selection accumulator.

30. The computer program product of claim 21 further comprising:

program code for designating an avoidance set of media selections which are to be avoided; and program code for generating a new playlist from the new selection using the mechanism that determines a distance between each pair of media selections, the waypoint segment selection generator and the selection accumulator with the constraint that media selections in the avoidance set cannot be included in the playlist.

* * * * *